Aug. 31, 1926.
M. FARKAS
1,597,961
BRICK MACHINE
Filed Nov. 6, 1925    3 Sheets-Sheet 1
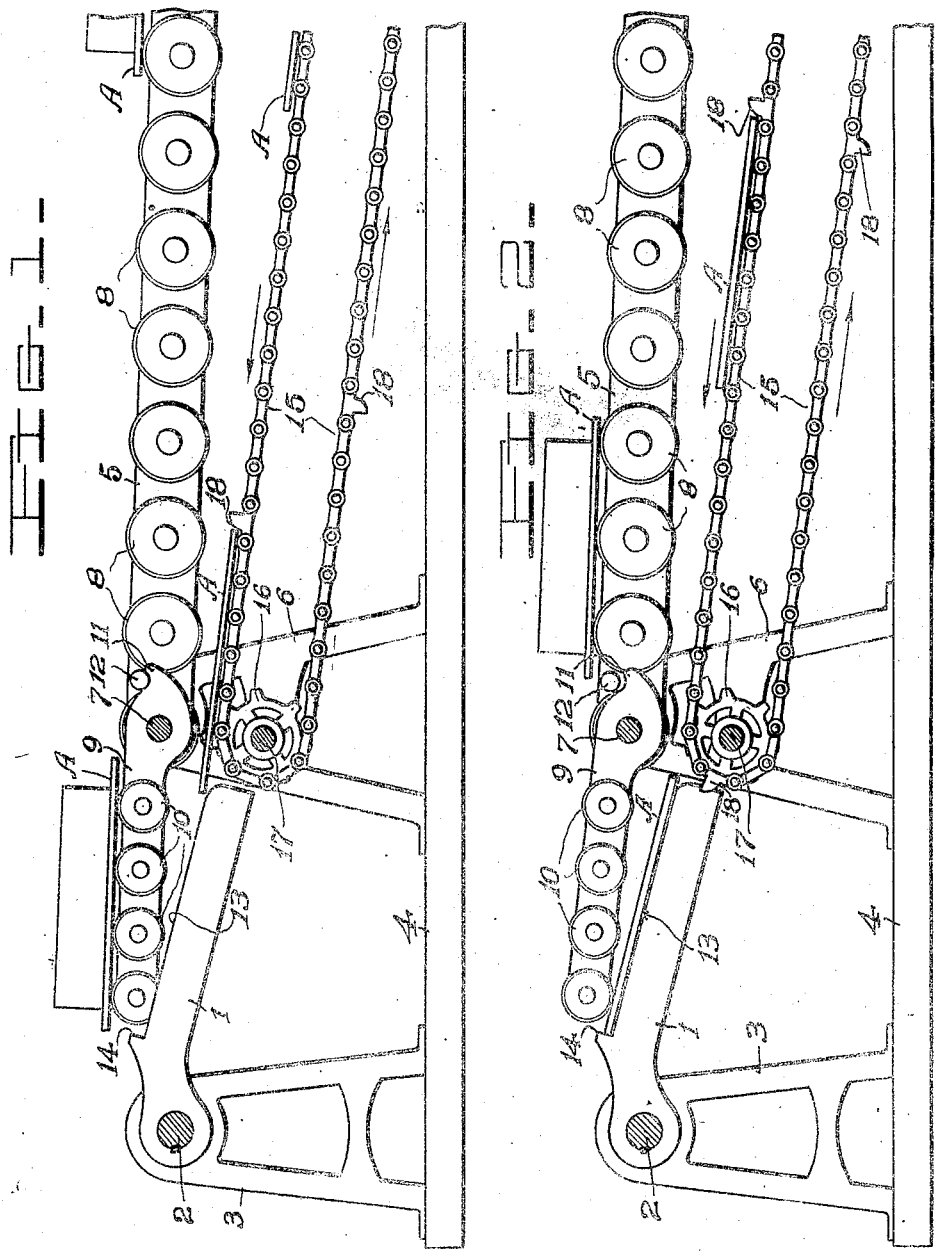
Inventor
Mike Farkas
Attorney

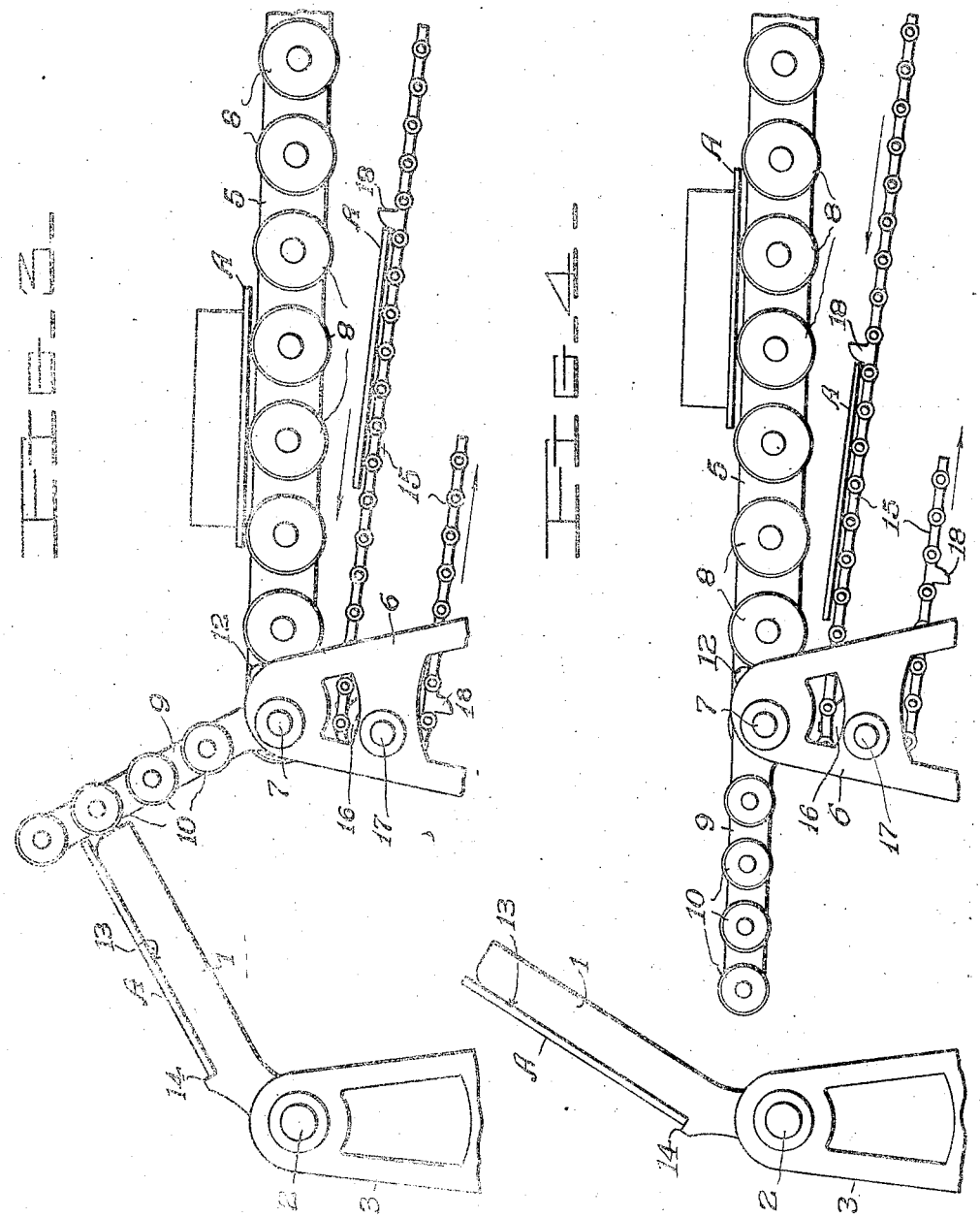

Aug. 31, 1926.
M. FARKAS
BRICK MACHINE
Filed Nov. 6, 1925  3 Sheets-Sheet 3
1,597,961
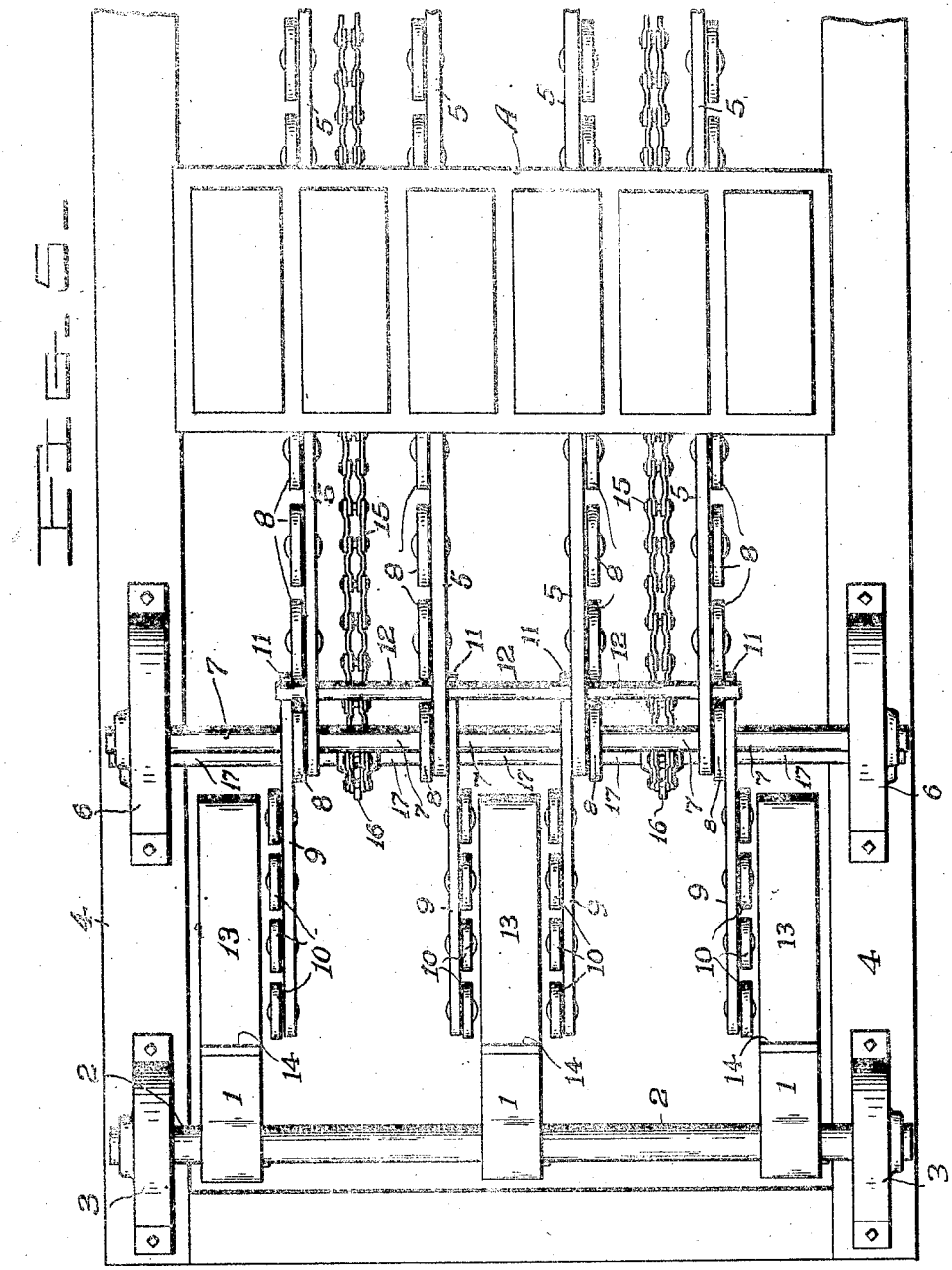
Inventor
Mike Farkas
Attorney Patented Aug. 31, 1926.

1,597,961

UNITED STATES PATENT OFFICE.

MIKE FARKAS, OF ROSETON, NEW YORK.

BRICK MACHINE.

Application filed November 6, 1925. Serial No. 67,280.

This invention relates to brick machines, but more particularly has reference to the construction of the gravity conveyors for delivering the molded bricks from the dumpers to the drying means.

The object of the invention is to automatically deliver and properly position the empty pallets upon the dumpers when the latter are in their lowermost position and below the gravity conveyors thus doing away with the services of the workman that handles the empty pallets and locates them upon the dumpers.

This invention has nothing whatever to do with the power operated means for elevating and lowering the dumpers, or with the drying means or with the operation of the endless sprocket chain upon which the pallets are placed for delivery to the dumpers, and therefore no illustrations in these respects will be furnished, particularly since these parts and constructions not illustrated are quite ordinary and are not at all necessary for an understanding of the present invention.

The gravity conveyors are provided with friction rollers and are inclined as usual, but the forward sections of these conveyors comprise pivoted members capable of being elevated and lowered, and when an empty pallet has been delivered and properly located upon the dumpers that are in their lowermost position below these pivoted members, the dumpers are swung upwardly and will strike against these members and elevate them until said dumpers have passed beyond the ends of said members whereupon the latter will drop to their normal position.

When the dumpers are in their elevated position with a pallet thereon a gang mold containing bricks is delivered upon the pallet, and the dumpers are then swung downwardly, passing between the conveyors and thereby causing the pallet loaded with the bricks to be deposited upon the friction rollers of the pivoted members, and the pallet thus loaded will move rearwardly by gravity and in the meantime another pallet will have been delivered and properly positioned upon the dumpers, and the operation above described repeated.

The molds may be removed by a workman stationed near the machine for that purpose, but the services of the workman who ordinarily handles the pallets is dispensed with, as above noted, or these molds may, as is usual, be removed automatically.

The accompanying drawings are to be read in connection with the description which will be hereinafter furnished, and in these drawings similar numerals of reference will be used to designate like parts.

Referring to these drawings—

Figure 1 is a broken side elevation illustrating this invention, the parts being shown as they appear immediately after a pallet loaded with bricks has been deposited by the downward swing of the dumpers upon the front sections of the conveyors—

Figure 2 is a similar view illustrating the position of parts after an empty pallet has been delivered upon the dumpers with the latter in their lowermost position—

Figure 3 is a similar view showing the dumpers in the act of being raised and displacing the pivoted sections of the conveyors—

Figure 4 is likewise a similar view showing the position of parts after the dumpers have been fully elevated and the pivoted sections dropped back to normal position, and Figure 5 is a plan view.

1 represents the dumpers that are rigid on shaft 2 the latter journaled at its extremities within suitable standards 3 that are secured to any ordinary base 4.

5 are the main conveyor rails that are spaced apart as usual and are supported in any suitable manner one set of these supports being shown herein and consisting of uprights 6 that rise from the base and are secured thereto, a cross rod 7 extending through the ends of the rails and having its extremities secured within the uprights, these rails being inclined as usual.

To these rails are journaled friction rollers 8 that extend above the upper surfaces of the rails and act as supports for the pallets in the manner hereinafter described.

9 are the forward sections of the rails which are pivoted around the rod 7 and have frictions rollers 10 journaled thereto and extending above the plane of these sections, as in the instance of the rollers 8, and the rear ends of these sections beyond their pivotal point are formed into suitable shoulders 11 which abut against a cross pin 12 carried by the rails 5 when these pivoted sections are lowered as shown at Figure 1.

When these pivoted sections are lowered they will form a continuation of the main rails 5 and will also be inclined from the front downwardly toward the rear so that both sets of rollers 8 and 10 will be in the same inclined plane.

The dumpers are constructed as usual with a platform 13 terminating at its inner end in a shoulder 14 which latter is for the purpose of retaining the pallets in position so that they will not slip off the dumpers, the pallets being designated A.

15 is an endless carrier made in the shape of a sprocket chain which is carried by sprockets 16. The forward pair of sprockets are journaled upon a shaft 17 supported within the uprights 6, while the rear pair of sprockets is similarly supported although such support is not shown herein since it is quite ordinary and in all respects is like the construction shown in the drawings.

The sprockets are power driven as usual the power driving instrumentalities not being shown herein since they are very ordinary it being merely necessary to state that they move the carrier in the direction noted by the arrows.

At suitable intervals each of the carrier chains 15 have similarly located and alined shoulders 18, and a workman at the rear of the machine places the empty pallets upon the carriers in abutment against the shoulders, and these carriers will convey an empty pallet to the dumpers with the latter in their lowermost position as shown at Figure 1, and the continued travel of the carriers will thrust the pallet upon the dumpers and against the shoulder 14 the parts being then in the position shown at Figure 2.

The dumpers carrying the pallet are then swung upwardly striking against the underside of the pivoted sections 9 and elevating them as shown at Figure 3, and when the dumpers have been elevated to their proper positions, the sections will drop back to normal position and the parts will be as is illustrated at Figure 4.

A mold of bricks is then delivered upon the pallet, and the dumpers lowered until they have assumed the position shown at Figure 1 and since the dumpers pass between the pivoted sections of the conveyors this will deposit the pallet loaded with bricks upon the rollers 10 and such pallet will immediately begin to slide rearwardly so that by the time a succeeding pallet has been delivered upon the dumpers the lowered pallet will be in about the position shown at Figure 2 so that the pivoted sections may be swung upwardly by the elevation of the dumpers as hereinbefore described.

Any desired number of uprights 6 may rise from the base to act as supports for the rails, but these uprights must be outside the carriers 15 so as not to interfere with the pallets.

It will thus be seen that the pallets are automatically carried and delivered in proper position upon the dumpers when the latter are in their lowermost positions thus doing away with the services of the workman who is at present a necessity for the purpose of handling empty pallets and placing them upon the dumpers.

What is claimed is:—

1. In a brick machine, the combination of spaced gravity conveyors having friction rolls and with their front sections pivoted so as to be capable of being raised and lowered, pivoted spaced dumpers capable of being swung downwardly and upwardly and passing between said conveyors, and means for automatically delivering empty pallets upon said dumpers.

2. In a brick machine, the combination of spaced gravity conveyors for the molded brick the front sections of said conveyors consisting of pivoted members capable of being raised and lowered, pivoted dumpers that swing downwardly between the conveyors to deposit a pallet loaded with brick on said conveyors, and means for automatically and continuously delivering empty pallets upon said dumpers after they have been swung to their lowest position, whereby said dumpers carrying a pallet will elevate said members and pass beyond them to the normal position for receiving a load of molded brick.

3. In a brick machine, the hereindescribed means for automatically delivering empty pallets upon the dumpers, consisting of spaced gravity conveyors, pivoted spaced dumpers capable of being swung downwardly and upwardly and passing between said conveyors, and means for automatically delivering empty pallets upon said dumpers when the latter are in their lowermost position below said conveyors, the forward portions of said conveyors capable of being so shifted as to permit of the upward swing of said dumpers with a pallet thereon.

4. In a brick machine, the combination of spaced gravity conveyors having friction rolls and with their front sections pivoted so as to be capable of being raised and lowered, pivoted spaced dumpers capable of being swung downwardly and upwardly and passing between said conveyors, and a continuously traveling endless carrier for the empty pallets, said carrier having shoulders at intervals against which said pallets are abutted and terminating at its forward end adjacent the ends of said dumpers when the latter are in their lowermost position.

In testimony whereof I affix my signature hereto.

MIKE FARKAS.